United States Patent
Busch et al.

(10) Patent No.: US 9,758,647 B2
(45) Date of Patent: Sep. 12, 2017

(54) RUBBER MIXTURE AND VEHICLE TIRE

(71) Applicant: Continental Reifen Deutschland GmbH, Hannover (DE)

(72) Inventors: Verena Busch, Barsinghausen (DE); Thomas Pietag, Stadthagen (DE); Corinna Schwarzendahl, Hannover (DE); Hong Peng Tang, Petaling Jaya (MY); Martin Francke, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 14/978,187

(22) Filed: Dec. 22, 2015

(65) Prior Publication Data

US 2016/0108211 A1   Apr. 21, 2016

Related U.S. Application Data

(63) Continuation of application No. PCT/EP2014/060378, filed on May 21, 2014.

(30) Foreign Application Priority Data

Jul. 3, 2013   (EP) .................................... 13174978

(51) Int. Cl.
| | | |
|---|---|---|
| *B60C 1/00* | (2006.01) | |
| *C08L 9/00* | (2006.01) | |
| *C08L 7/00* | (2006.01) | |
| *C08K 5/00* | (2006.01) | |

(52) U.S. Cl.
CPC ..... *C08L 9/00* (2013.01); *B60C 1/00* (2013.01); *C08L 7/00* (2013.01); *C08K 5/005* (2013.01); *C08L 2205/02* (2013.01)

(58) Field of Classification Search
CPC ....................................................... C08L 9/00

USPC .......................................................... 524/526
See application file for complete search history.

(56) References Cited

U.S. PATENT DOCUMENTS

| | | |
|---|---|---|
| 5,296,129 A | 3/1994 | Ikeda et al. |
| 6,201,049 B1 | 3/2001 | Sakamoto et al. |
| 7,498,366 B2 | 3/2009 | Taguchi |

FOREIGN PATENT DOCUMENTS

| | | | |
|---|---|---|---|
| DE | 10 2004 009 010 A1 | | 11/2004 |
| EP | 2 311 907 A1 | | 4/2011 |
| JP | 4-103646 A | | 4/1992 |
| JP | 2004-300361 A | | 10/2004 |
| JP | 2013082884 A | * | 5/2013 |
| JP | 2013159666 A | | 8/2013 |
| WO | 2013046845 A1 | | 4/2013 |

OTHER PUBLICATIONS

Translation of JP 2013-082884, May 9, 2013.*
International Search Report dated Jul. 1, 2014 of international application PCT/EP2014/060378 on which this application is based.

* cited by examiner

*Primary Examiner* — Hui Chin
(74) *Attorney, Agent, or Firm* — Walter Ottesen, P.A.

(57) ABSTRACT

A rubber mixture and a pneumatic vehicle tire having a rubber mixture containing the following constituents: 15 to 55 phr of at least one natural polyisoprene and/or 15 to 55 phr of at least one synthetic polyisoprene and 15 to 85 phr of at least one polybutadiene and 25 to 55 phr of at least one carbon black and 1 to 10 phr of at least one ozone protection wax, wherein the ozone protection wax contains unbranched hydrocarbons having the following chain length distribution consisting of at least the three ranges A, B and C: range A: hydrocarbons having 26 to 31 carbon atoms, range B: hydrocarbons having 32 to 36 carbon atoms, range C: hydrocarbons having 37 to 47 carbon atoms, wherein the relative proportions of the ranges A to B to C are (0.7-1.5) to 1 to (0.6 - 1.4).

14 Claims, No Drawings

US 9,758,647 B2

RUBBER MIXTURE AND VEHICLE TIRE

CROSS REFERENCE TO RELATED APPLICATIONS

This application is a continuation application of international patent application PCT/EP2014/060378, filed May 21, 2014, designating the United States and claiming priority from European application 13174978.0, filed Jul. 3, 2013, and the entire content of both applications is incorporated herein by reference.

FIELD OF THE INVENTION

The disclosure relates to a rubber mixture and to a pneumatic vehicle tire.

BACKGROUND OF THE INVENTION

It is known that pneumatic vehicle tires include constituents which significantly retard the aging and oxidation of the rubbers and other constituents present and which therefore positively influence the durability over a relatively long lifetime of the tire.

Furthermore, however, it is also known that aging inhibitors and antiozonant waxes present in the external components of pneumatic vehicle tires can migrate to the surface, where they form a visible film. This phenomenon, known as blooming, has adverse consequences in turn for the visual appearance of the pneumatic vehicle tire.

U.S. Pat. No. 6,201,049 discloses a rubber mixture for the sidewall of pneumatic vehicle tires, comprising a wax which contains a component having 45 or more carbon atoms in an amount of 3 to 10 wt %.

U.S. Pat. No. 7,498,366 as well describes a rubber mixture which comprises paraffin wax for the sidewall of pneumatic vehicle tires.

U.S. Pat. No. 5,296,129 discloses a rubber mixture which comprises natural rubber and polypropylene and also a paraffin wax mixture, in each of which the amount of hydrocarbons having 31 to 44 carbon atoms is not less than 2 percent by weight.

A common characteristic of the publications cited is that the composition of the rubber mixture is intended to improve the visual appearance and/or the cracking resistance.

SUMMARY OF THE INVENTION

Against the background of the prior art, then, the object on which the disclosure is based is that of providing a rubber mixture for external components of pneumatic vehicle tires that exhibits a further improvement in terms of blooming, with no adverse effect, and/or even with improvement, in the aging resistance and the other physical properties, such as tensile strength and/or hardness and/or tear properties and/or rebound elasticities.

The object is achieved by a rubber mixture comprising the following constituents:
- 15 to 55 phr of at least one natural polyisoprene and/or 15 to 55 phr of at least one synthetic polyisoprene,
- 15 to 85 phr of at least one polybutadiene,
- 25 to 55 phr of at least one carbon black, and
- 1 to 10 phr of at least one antiozonant wax, the antiozonant wax including unbranched hydrocarbons with the chain length distribution below, having at least the three ranges A and B and C:
  - i. range A: hydrocarbons having 26 to 31 carbon atoms
  - ii. range B: hydrocarbons having 32 to 36 carbon atoms
  - iii. range C: hydrocarbons having 37 to 47 carbon atoms, the relative proportions of the ranges of A to B to C being 0.7 to 1.5:1:0.6 to 1.4.

Surprisingly, the rubber mixture with the combination of the stated constituents exhibits particularly low blooming, and this is manifested in an improved visual appearance of the rubber mixture after a corresponding duration.

The phr unit used in this specification (parts per hundred parts of rubber by weight) is the conventional quantitative unit for mixture formulations in the rubber industry. The metered quantity of the parts by weight of the individual substances here is always based on 100 parts by weight of the overall composition of all of the rubbers present in the mixture.

The rubber mixture of the disclosure contains 15 to 55 phr of at least one natural polyisoprene and/or 15 to 55 phr of at least one synthetic polyisoprene.

The amount of natural and/or synthetic polyisoprene is preferably 25 to 55 phr, more preferably 35 to 55 phr.

This means that a combination of natural and synthetic polyisoprene is also conceivable.

In one particularly preferred embodiment, the rubber mixture contains 40 to 55 phr of at least one natural and/or synthetic polyisoprene. This means that a combination of natural and synthetic polyisoprene is also conceivable. In this embodiment, however, the component in question is preferably natural polyisoprene. A rubber mixture of such a kind exhibits, especially in the sidewall of pneumatic vehicle tires, particularly good blooming characteristics and also comparatively good tear and abrasion properties, especially after aging.

The natural polyisoprene and the synthetic polyisoprene in question may include all of the types known to the skilled person.

The rubber mixture of the invention contains 15 to 85 phr, preferably 15 to 59 phr, of at least one polybutadiene.

In one particularly preferred embodiment of the invention, the rubber mixture contains 15 to 50 phr, very preferably 15 to 30 phr, of at least one polybutadiene. A rubber mixture of this kind exhibits, especially in the sidewall of pneumatic vehicle tires, particularly good blooming characteristics and also comparatively good tear and abrasion properties, especially after aging.

The polybutadiene (BR, butadiene rubber) may include all of the types known to the skilled person. These include, among others, the so-called high-cis and low-cis types, where butadiene rubber with a cis fraction greater than or equal to 90 wt % is referred to as of high-cis type, and butadiene rubber with a cis fraction of less than 90 wt % is referred to as of low-cis type. An example of a low-cis polybutadiene is Li-BR (lithium-catalyzed butadiene rubber), with a cis fraction of 20 to 50 wt %. An example of a high-cis polybutadiene is Nd-BR (neodymium-catalyzed butadiene rubber). With Nd-BR, particularly good vulcanizate properties are achieved in the rubber mixture. The polybutadiene used may have been endgroup-modified.

According to an advantageous development, there is at least one further diene rubber present in the rubber mixture, and in this context all diene rubbers known to the skilled person are contemplated. In accordance with the advantageous development, there is preferably at least one styrene-butadiene rubber present in the rubber mixture. The styrene-butadiene rubber (styrene-butadiene copolymer) may be solution-polymerized styrene-butadiene copolymer (S-SBR) having a styrene content, based on the polymer, of about 5 to 45 wt % and a vinyl content (amount of 1,2-bonded butadiene, based on the overall polymer) of 5 to 70 wt %, which may be prepared, for example, using lithium alkyls in organic solvent. The S-SBR may also have been coupled and/or endgroup-modified and/or modified along the carbon chain (backbone-modified).

Also possible for use, however, are emulsion-polymerized styrene-butadiene copolymer (E-SBR) and also mixtures of E-SBR and S-SBR. The styrene content of E-SBR is about 15 to 50 wt %, and the types that may be used are those known from the prior art and obtained by copolymerization of styrene and 1,3-butadiene in aqueous emulsion.

The rubber mixture of the invention contains 25 to 55 phr, preferably 25 to 49 phr, of at least one carbon black. A rubber mixture of this kind exhibits, especially in the sidewall of pneumatic vehicle tires, particularly good blooming characteristics and also comparatively good tear properties, especially after aging, and in addition reduces the rolling resistance of the tire.

In one preferred embodiment of the invention, the rubber mixture contains 25 to 43 phr, more preferably 30 to 39 phr, of at least one carbon black.

All types of carbon black known to the skilled person are conceivable here.

Preference is nevertheless given to using a carbon black which has an iodine adsorption number to ASTM D 1510 of 15 to 100 g/kg, preferably 30 to 100 g/kg, more preferably 50 to 100 g/kg, and a DBP number to ASTM D 2414 of 30 to 150 ml/100 g, preferably 50 to 150 ml/100 g, more preferably 100 to 150 ml/100 g.

By this means, particularly good rolling resistance and/or tear properties are obtained in the pneumatic vehicle tire in use.

According to one preferred embodiment, a carbon black is used that has an iodine adsorption number to ASTM D 1510 of 80 to 100 g/kg and a DBP number to ASTM D 2414 of 115 to 127 ml/100 g.

The rubber mixture may, in addition to carbon black, also include other known polar and/or nonpolar fillers.

Carbon black is preferably included as the sole filler or as the main filler in the rubber mixture, meaning that the amount of carbon black is significantly greater than the amount of any other fillers included. Where not only carbon black but also a further filler is included, the further filler is preferably silica. It is therefore also conceivable for the rubber mixture to include carbon black and silica, such as, for example, 25 to 55 phr of carbon black, preferably 25 to 49 phr, more preferably 25 to 43 phr of carbon black, very preferably 30 to 39 phr of carbon black, in combination with 0.1 to 10 phr of silica.

The silicas in question may be the silicas known to the skilled person and suitable as a filler for tire rubber mixtures. It is particularly preferred, though, if a finely divided, precipitated silica is used that has a nitrogen surface area (BET surface area) (to DIN ISO 9277 and DIN 66132) of 35 to 350 $m^2/g$, preferably of 35 to 260 $m^2/g$, more preferably of 100 to 260 $m^2/g$, and very preferably of 130 to 235 $m^2/g$, and a CTAB surface area (to ASTM D 3765) of 30 to 400 $m^2/g$, preferably of 30 to 250 $m^2/g$, more preferably of 100 to 250 $m^2/g$, and very preferably of 125 to 230 $m^2/g$. Silicas of this kind lead to particularly good physical properties of the vulcanizates. There may also be resulting advantages in the processing of the mixture, as a result of a reduction in the mixing time for unchanged product properties, leading to improved productivity. Examples of silicas that may be employed are therefore those of the Ultrasil® VN3 type (trade name) from Evonik, and also highly dispersible silicas, known as HD silicas (for example, Zeosil® 1165 MP from Rhodia).

In order to improve the processing properties and to attach the silica and any other polar fillers present to the diene rubber, it is possible to use silane coupling agents known to the skilled person in rubber mixtures.

With particular preference, however, the rubber mixture is free from further fillers other than carbon black; in this preferred embodiment, in other words, the rubber mixture contains 0 phr of a further filler. In this embodiment, accordingly, the metered addition of a second filler is unnecessary. Zinc oxide is not considered a filler in this context.

Preferably, the rubber mixture comprises 1 to 10 phr of at least one antiozonant wax, the antiozonant wax comprising unbranched hydrocarbons with the chain length distribution below, consisting of at least the three ranges A and B and C:
 range A: hydrocarbons having 26 to 31 carbon atoms
 range B: hydrocarbons having 32 to 36 carbon atoms
 range C: hydrocarbons having 37 to 47 carbon atoms, the relative proportions of the ranges of A to B to C being 0.7 to 1.5:1:0.6 to 1.4.

Conceivable in this context are all antiozonant waxes known to the skilled person. The antiozonant wax is preferably a paraffin wax.

The chain length of hydrocarbons is a function of the number of carbon atoms. The chain length distribution is determined by gas chromatography coupled with a flame ionization detector (GC-FID). The procedure and evaluation are in accordance with the EWF (European Wax Federation) method.

For each chain length of the unbranched hydrocarbons, the relative proportion is ascertained. The "relative proportion of an unbranched hydrocarbon" in the context of the present disclosure means the proportion of the peak area or signal area of a hydrocarbon, relative to the entirety of all peak areas or signal areas of the antiozonant wax.

The relative proportion of each range A, B, and C is calculated by summing the individual relative proportions of the respectively associated unbranched hydrocarbons (n-alkanes).

It is preferred for the ratio of unbranched (n, normal) to branched (iso) hydrocarbons in the antiozonant wax, based on the entirety of the antiozonant wax, in other words the entire chain length distribution including the ranges A, B, and C, to be 95:5 to 65:35.

The skilled person understands unbranched hydrocarbons to be n-alkanes.

It is preferred, furthermore, if the relative proportion of each of the individual unbranched hydrocarbons having a number of carbon atoms of 26 to 47 in the antiozonant wax does not exceed 5.5%. This means that the chain length distribution of the unbranched hydrocarbons having 26 to 47 carbon atoms is comparatively flat.

With a chain length distribution of this kind in the antiozonant wax, blooming in the rubber mixture is particularly low and therefore good.

The antiozonant wax contains, as described above, unbranched hydrocarbons having a chain length of 26 to 47 carbon atoms. The antiozonant wax may further contain unbranched hydrocarbons having a chain length of 25 or fewer carbon atoms and/or 48 or more carbon atoms.

It is preferred, moreover, if the antiozonant wax comprises n-alkanes having 25 or fewer and 48 or more carbon atoms in an overall proportion of 0 to 18%. In this case the overall proportion of the n-alkanes having 25 or fewer carbon atoms is preferably 5% to 12%, and the overall proportion of the n-alkanes having 48 or more carbon atoms is preferably 0 to 6%.

The antiozonant wax described is included in amounts of 1 to 10 phr, preferably 1 to 5 phr, more preferably 1 to 3 phr in the rubber mixture.

The rubber mixture of the disclosure, furthermore, may comprise customary adjuvants in customary parts by weight. These adjuvants include a) aging inhibitors, such as, for example,
N-phenyl-N'-(1,3-dimethylbutyl)-p-phenylenediamine (6PPD),
N,N'-diphenyl-p-phenylenediamine (DPPD),
N,N'-ditolyl-p-phenylenediamine (DTPD),
N-isopropyl-N'-phenyl-p-phenylenediamine (IPPD),
2,2,4-trimethyl-1,2-dihydro-quinoline (TMQ), b) activators, such as, for example, zinc oxide and fatty acids (for example, stearic acid), c) resins, such as phenolic resins and/or aliphatic resins, d) mastication aids, such as, for example,
2,2'-dibenz-amidodiphenyl disulfide (DBD), e) plasticizers, as described below.

The proportion of the total amount of further adjuvants is 3 to 150 phr, preferably 3 to 100 phr, and more preferably 5 to 80 phr.

Within the overall proportion of the further adjuvants there are also 0.1 to 4 phr, preferably 0.1 to 3.8 phr, more preferably 2 to 3.8 phr, of zinc oxide (ZnO).

The ZnO in question may be any of the types of zinc oxide known to the skilled person, such as, for example, ZnO granules or powders. The zinc oxide conventionally used generally has a BET surface area of less than 10 m$^2$/g. Also used, however, may be what is called nano-zinc oxide, having a BET surface area of 10 to 60 m$^2$/g.

In the rubber mixture there may also be 0 to 70 phr, preferably 0.1 to 60 phr, preferably 10 to 50 phr, of at least one plasticizer, which is included among the adjuvants. This plasticizer is selected from the group consisting of mineral oils and/or synthetic plasticizers and/or fatty acids and/or fatty acid derivatives and/or resins and/or factices and/or glycerides and/or terpenes and/or biomass-to-liquid oils (BTL oils) and/or rubber-to-liquid oils (RTL oils) and/or liquid polymers, with mineral oils being particularly preferred. Where mineral oil is used, it is preferably selected from the group consisting of DAE (distilled aromatic extracts) and/or RAE (residual aromatic extract) and/or TDAE (treated distilled aromatic extracts) and/or MES (mild extracted solvents) and/or naphthenic oil.

The vulcanization is carried out in the presence of sulfur or sulfur donors with the aid of vulcanization accelerators, it being possible for certain vulcanization accelerators to act as sulfur donors at the same time. Sulfur or sulfur donors and also one or more accelerators are added to the rubber mixture in the final mixing step, in the quantities stated. The accelerator is selected in this case from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators. Preferred is the use of at least one sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfene morpholide (MBS) and/or N-tert-butyl-2-benzothiazylsulfenamide (TBBS). In one preferred embodiment, the rubber mixture comprises CBS and/or TBBS as accelerator(s). Particularly good tear properties of the rubber mixture are achieved as a result.

The rubber mixture preferably contains elemental sulfur in amounts of 0.5 to 3 phr, preferably 1 to 3 phr, more preferably 1 to 2.7 phr, very preferably 1.3 to 2.4 phr.

According to one particularly preferred embodiment of the disclosure, the rubber mixture contains 2.0 to 2.4 phr of sulfur. A rubber mixture of this kind exhibits, especially in the sidewall of pneumatic vehicle tires, particularly good blooming characteristics and also comparatively good tear and abrasion properties, especially after aging.

The rubber mixture preferably contains at least one sulfenamide accelerator in amounts of 0.1 to 4 phr, more preferably 0.1 to 3 phr, very preferably 0.5 to 3 phr.

According to one particularly preferred embodiment, the rubber mixture contains 0.9 to 1.3 of at least one sulfenamide accelerator.

A rubber mixture of this kind exhibits, especially in the sidewall of pneumatic vehicle tires, particularly good blooming characteristics and also comparatively good tear and abrasion properties, especially after aging.

The rubber mixture of the disclosure is produced by the method customary in the rubber industry, where first of all a base mixture with all of the constituents apart from the vulcanizing system (sulfur and substances influencing vulcanization) is produced in one or more mixing stages. Adding the vulcanizing system in a final mixing stage produces the completed mixture. The completed mixture is further processed by an extrusion procedure, for example, and is converted into the appropriate form.

A further object of the present disclosure is that of providing a pneumatic vehicle tire which is distinguished by an improved visual appearance in terms of blooming, with no adverse effect, and/or even with improvement, in the aging resistance and the other properties of the tire, such as handling behavior and/or wet braking and/or tear properties and/or rolling resistance. This object is achieved by the pneumatic vehicle tire including at least one rubber mixture of the invention as described above in at least one component. All of the observations stated above concerning the constituents and their features are valid here.

The component in question is preferably an external component, more preferably a sidewall and/or a flange profile.

Very preferably it is the sidewall.

DESCRIPTION OF THE PREFERRED EMBODIMENTS OF THE INVENTION

The disclosure is now to be elucidated in more detail using comparative examples and working examples which are summarized in Table 1.

The comparative mixture is labeled C, the inventive mixture I.

Mixture production took place under customary conditions in two stages in a laboratory tangential mixer. Test specimens were produced from all of the mixtures by vulcanization, and these test specimens were used for determination of the physical properties typical of the rubber industry. For the above-noted tests on test specimens, the test methods employed were as follows:

Shore A hardness (Shore A unit, abbreviated ShA) at room temperature (RT) in accordance with DIN 53 505

Rebound elasticity (abbreviated rebound) at room temperature (RT) according to DIN 53 512

Tensile strength at room temperature according to DIN 53 504

Blooming: built and vulcanized tires were stored for 3 months, protected from moisture and solar radiation, and then evaluated visually. Class 1: satisfactory visual appearance, class 2: adequate visual appearance, class 3: inadequate visual appearance Ozone resistance at room temperature according to DIN 53 509/DIN ISO 1431-1 similar conditions: ozone concentration 200 pphm, +/−30 pphm, temperature 25° C.+/−3° C., 60%+/−5% atmospheric humidity, and a static elongation between 10% and 60%, the evaluation taking place in a method based on DIN 53 509/DIN ISO 1431-1, evaluation: positive (no cracking) or negative (cracking)

TABLE 1

|  | unit | C1 | I1 |
| --- | --- | --- | --- |
| Constituents |  |  |  |
| Natural rubber TSR | phr | 40 | 40 |
| Polyisoprene, synthetic | phr | 10 | 10 |
| Butadiene rubber[a] | phr | 20 | 20 |
| SBR[b] | phr | 30 | 30 |
| Carbon black N339 | phr | 33 | 33 |
| Aging inhibitor | phr | 5 | 5 |
| Other adjuvants | phr | 14.5 | 14.5 |
| Antiozonant wax A[c] | phr | 1.5 | — |
| Antiozonant wax B[d] | phr | — | 1.5 |
| Sulfur and sulfenamide accelerator | Phr | 3.3 | 3.3 |
| Properties |  |  |  |
| Tensile strength at RT | MPa | 11 | 14 |
| Rebound elasticity at RT | % | 51 | 51 |
| Shore hardness at RT | Shore A | 49 | 49 |
| Blooming | class | 3 | 1 |
| Ozone resistance |  | positive | positive |

[a] butadiene rubber, Nd-catalyzed, high-cis BR
[b] styrene-butadiene rubber, solution-polymerized, SBR 1500
[c] antiozonant wax A: Okerin ® 2122H from Paramelt, chain length distribution A:B:C = 1.2:1:0.3
[d] antiozonant wax B: VARAZON ® 6500 from Sasol Wax GmbH, chain length distribution A:B:C = 1.1:1:1

As is apparent from Table 1, the inventive rubber mixture I1, in comparison to its reference C1, exhibits much better blooming characteristics, so putting the inventive mixture at a satisfactory level. At the same time there are no adverse effects on the other properties, especially the ozone resistance.

It is understood that the foregoing description is that of the preferred embodiments of the invention and that various changes and modifications may be made thereto without departing from the spirit and scope of the invention as defined in the appended claims.

What is claimed is:

1. A rubber mixture comprising:
   15 to 55 phr of at least one natural polyisoprene and/or 15 to 55 phr of at least one synthetic polyisoprene;
   15 to 85 phr of at least one polybutadiene;
   25 to 55 phr of at least one carbon black; and,
   1 to 10 phr of at least one antiozonant wax, the antiozonant wax including unbranched hydrocarbons having a chain length distribution within the ranges A and B and C:
   i. range A: hydrocarbons having 26 to 31 carbon atoms,
   ii. range B: hydrocarbons having 32 to 36 carbon atoms,
   iii. range C: hydrocarbons having 37 to 47 carbon atoms,
   wherein the relative proportions of the ranges of A to B to C are 0.7 to 1.1:1.0:1.0.

2. The rubber mixture as claimed in claim 1, wherein a ratio of n to iso hydrocarbons in the antiozonant wax, based on the entirety of the antiozonant wax, is 95:5 to 65:35.

3. The rubber mixture as claimed in claim 1, wherein a relative proportion of each of the individual unbranched hydrocarbons having a number of carbon atoms of 26 to 47 in the antiozonant wax does not exceed 5.5%.

4. The rubber mixture as claimed in claim 1, wherein the antiozonant wax comprises n-alkanes having 25 or fewer and 48 or more carbon atoms in an overall proportion of 0 to 18%.

5. A pneumatic vehicle tire comprising at least one rubber mixture as claimed in claim 1 in at least one external component.

6. The rubber mixture as claimed in claim 1, comprising:
   40 to 55 phr of at least one natural polyisoprene and/or at least one synthetic polyisoprene;
   15 to 30 phr of at least one polybutadiene; and
   30 to 39 phr of at least one carbon black.

7. The rubber mixture as claimed in claim 1, wherein the filler consists essentially of carbon black and/or silica.

8. The rubber mixture as claimed in claim 1, wherein the filler consists of carbon black and/or silica.

9. The rubber mixture as claimed in claim 1, wherein the filler consists of 30 to 39 phr of carbon black and 0.1 to 10 phr of silica.

10. A rubber mixture comprising:
    15 to 55 phr of at least one natural polyisoprene and/or 15 to 55 phr of at least one synthetic polyisoprene;
    15 to 85 phr of at least one polybutadiene;
    25 to 55 phr of at least one carbon black; and,
    1 to 10 phr of at least one antiozonant wax, the antiozonant wax including unbranched hydrocarbons having a chain length distribution within the ranges A and B and C:
    i. range A: hydrocarbons having 26 to 31 carbon atoms,
    ii. range B: hydrocarbons having 32 to 36 carbon atoms,
    iii. range C: hydrocarbons having 37 to 47 carbon atoms,
    wherein the relative proportions of the ranges of A to B to C are 0.7 to 1.1:1.0:1.0, and
    wherein at least one antiozonant wax is present in an amount of from 5 to 10 phr.

11. The rubber mixture as claimed in claim 1, wherein the tensile strength at room temperature is 14 MPa.

12. A rubber mixture comprising:
    15 to 55 phr of at least one natural polyisoprene and/or 15 to 55 phr of at least one synthetic polyisoprene;
    15 to 85 phr of at least one polybutadiene;
    25 to 55 phr of at least one carbon black; and,
    1 to 10 phr of at least one antiozonant wax, the antiozonant wax including unbranched hydrocarbons having a chain length distribution within the ranges A and B and C:
    i. range A: hydrocarbons having 26 to 31 carbon atoms,
    ii. range B: hydrocarbons having 32 to 36 carbon atoms,
    iii. range C: hydrocarbons having 37 to 47 carbon atoms,
    wherein the relative proportions of the ranges of A to B to C are 0.7 to 1.1:1.0:1.0, and
    wherein the antiozonant wax comprises n-alkanes having 25 or fewer and 48 or more carbon atoms in an overall proportion of 0 to 12%.

13. The rubber mixture as claimed in claim 1, wherein antiozonant wax is a paraffin wax.

14. A rubber mixture comprising:
- 15 to 55 phr of at least one natural polyisoprene and/or 15 to 55 phr of at least one synthetic polyisoprene;
- 15 to 85 phr of at least one polybutadiene;
- 25 to 55 phr of at least one carbon black; and,
- 5 to 10phr of at least one antiozonant wax, the antiozonant wax including unbranched hydrocarbons having a chain length distribution within the ranges A and B and C:
  - i. range A: hydrocarbons having 26 to 31 carbon atoms,
  - ii. range B: hydrocarbons having 32 to 36 carbon atoms,
  - iii. range C: hydrocarbons having 37 to 47 carbon atoms,
- wherein the relative proportions of the ranges of A to B to C are 0.7 to 1.5:1:0.6 to 1.4.

* * * * *